United States Patent Office 3,438,737
Patented Apr. 15, 1969

3,438,737
PROTEIN TEST COMPOSITION, DEVICE
AND METHOD
Roger Lee Atkinson, Three Rivers, Mich., and Marshall
Lloyd Fader, Elkhart, Ind., assignors to Miles Laboratories, Inc., Elkhart, Ind., a corporation of Indiana
No Drawing. Continuation-in-part of application Ser. No. 492,264, Oct. 1, 1964. This application May 5, 1966, Ser. No. 547,766
Int. Cl. G01n 31/22
U.S. Cl. 23—230     28 Claims

ABSTRACT OF THE DISCLOSURE

A test composition, device and method for detecting protein in fluids comprising a pH chromogenic indicator material exhibiting protein error, a buffer for maintaining the pH of the test system at a value within the pH range in which the pH indicator is normally chromogenically responsive to a change in pH and, preferably, a background coloring material. The system is also preferably incorporated with a bibulous carrier material.

---

This application is a continuation-in-part of copending application Ser. No. 492,264, filed Oct. 1, 1964 and now abandoned.

This invention relates to improved test compositions for the qualitative detection and quantitative determination of proteinaceous materials in fluids. In one of its more particular aspects it relates to test compositions and methods for the qualitative detection and quantitative determination of albumins in biological fluids. In still another aspect it relates to test devices prepared by incorporating such test compositions into and/or upon bibulous carriers.

As used hereinafter, the term "detection" means both the qualitative and quantitative determination of a particular material.

The detection of water soluble proteinaceous materials in various fluids results in many advantageous benefits to mankind. For example, the presence of albumin in human urine has long been known to be an indication of a diseased or traumatic condition. For this reason the prior art is replete with tests for such materials. These tests, however, are often quite lengthy and require rather elaborate laboratory equipment, including instrumentation and the employment of skilled technicians. Furthermore, when it is desired to conduct a large number of such tests, the greatly multiplied manipulative steps required by the prior art methods demands the services of a correspondingly large staff of analysts, if the results are to be known within a reasonable time.

In order to avoid the above noted difficulties, test methods and compositions have been developed in recent years which can be utilized by unskilled workers and require a minimum of apparatus. These test methods have usually relied on the so-called "protein error" phenomenon which is exhibited by certain chromogenic indicators whereby, in the presence of proteins, such indicators undergo a chromogenic response at a pH value different than that at which they respond in the absence of proteins. That is to say, an indicator which exhibits protein error will, in a solution containing protein, indicate a higher or lower pH value for such solutions than is actually the case, and the extent to which the point of response of the indicator is shifted, is an indication of the amount of protein in solution.

In accordance with the protein error concept, test compositions and devices have been prepared which consist essentially of a chromogenic indicator which exhibits protein error and a buffer effective to maintain the environment immediately surrounding the indicator at a specific pH value. This pH value has heretofore been maintained at a value adjacent to but outside of the range in which the response of the indicator to a pH change normally occurs. For example, if the indicator is normally responsive through a pH range of 3.0 to 4.5, the protein test composition incorporating said indicator is usually buffered to a pH value of 3.0 or below according to prior art practice.

In order to produce a test device which is easy to manipulate, stable on storage and economical to manufacture and utilize, it is preferable to incorporate such test compositions into and/or upon a carrier member. This member is usually an absorbent or bibulous material such as filter paper, wood, fibrous synthetic materials and the like. The test composition can be impregnated into or coated on the carrier and the combination of the test composition and carrier can be utilized by itself or with an additional support backing.

When the known test compositions and methods for the detection of protein in fluids are utilized, the response to protein is usually rather limited in that maximum sensitivity is not achieved for the particular indicator, the colors produced are pale and the amount of protein present is difficult to estimate visually. This is particularly true when a bibulous carrier is utilized and for reasons of economy and ease of manufacture, the carrier is quite thin and the resultant amount of test composition incorporated therewith rather limited. Moreover such color changes are usually in saturation rather than hue and are difficult to detect.

At this point, it would be advantageous to define the color terminology utilized in the disclosure of the present invention. Hue is defined as that quality of a particular color that leads one to give it a name such as red or blue. For example, when a color changes from yellow to green, it is said to change in hue. Saturation may be defined as the percentage of a particular hue in a color. For example, a change from pale blue to deep blue is a change in saturation of the color.

It is an object of the present invention to provide an improved, extremely sensitive test composition for detecting proteinaceous materials in fluids. It is another object to provide a test composition which exhibits a vivid chromogenic response to the presence of proteinaceous materials in fluids. It is still another object to provide an extremely sensitive test composition which shows an excellent change in hue reflecting the amount of protein present in a fluid. It is a further object to provide such test compositions incorporated with a bibulous carrier. Other objects will become apparent from the ensuing disclosure and the claims appended thereto.

It has now been discovered, quite unexpectedly, that the above noted objects are accomplished by maintaining the pH of the test composition within and preferably at a value adjacent to the midpoint, rather than outside of, the range in which the chromogenic indicator thereof normally exhibits a color change or chromogenic response to a change in pH. This is viewed as surprising and novel, since the prior art practice has involved a radically different concept of pH adjustment, i.e., the prior art teaches that for an operative protein test the chromogenic indicator which exhibits protein error must be adjusted or buffered to a pH outside of its normal pH color change range.

In accordance with the concept of the present invention, if the pH of the test composition is buffered to a value substantially within and preferably adjacent to the midpoint of the normal color change range of the chromogenic indicator which exhibits protein error, a highly sensitive, vividly responsive protein test composition is achieved.

For example, if the chromogenic indicator is normally responsive to a pH change in a range of from 3.0 to 4.5, it is preferable to buffer the pH of the test composition to a pH of about 3.5 to 4.0.

It should be noted at this point that actual chromogenic pH response ranges for particular indicators may vary considerably depending on solvent systems used, lighting conditions, purity of indicator, subjective observation of color changes, concentrations, salt effect of buffer, additives such as surface active agents, and so forth. Thus, as used herein, the stated normal pH response range for an indicator may differ considerably from the particular findings of individual investigators. Such differences are not to be interpreted to mean that these deviations from the ranges indicated herein cause a particular indicator system to fall outside the scope of the present invention. It is merely indicative that the stipulated ranges were obtained using the particular testing conditions and indicator characteristics noted above. The normal pH response range for an indicator may thus be defined as the pH range in which the indicator material changes from a fixed acid hue to a fixed basic hue using the indicated test parameters. The term fixed hue means that adding more acid or base to a specific solution of the indicator does not change the hue thereof. The term acid hue means the hue exhibited by the indicator when the pH of a solution of the indicator is maintained at a pH lower than the response range of the indicator. The term basic hue means the hue exhibited by the indicator when the pH of a solution of the indicator is maintained at a pH higher than the response range of the indicator. These definitions apply regardless of whether the particular pH indicated is above or below pH 7. For example, the indicator solution may be adjusted to a pH on the basic side thereof, i.e., it exhibits a basic hue, even though it is at a pH lower than 7.0.

In addition to the above noted improvements, it has also been found that a background coloring material may be advantageously included in the test compositions of the present invention and such use is preferred. As will be elucidated more fully hereinbelow, this material serves a dual function, i.e., it tends to mask any slight color response which may be exhibited by the indicator because of the novel buffering of the indicator to a pH within its response range and it also gives a more precise quantitation of the amount of protein present in the solution being tested. Background dyes have been used in the prior art but their use and function has been for other purposes. For example, certain test compositions exhibit an unattractive appearance in the unreacted state and/or are subject to degradation or discoloration upon aging. In these instances, the use of a background dye results in a more elegant initial product and/or serves to maintain the initial appearance of the product during prolonged shelf life. It should be observed however that such use of a background dye involves a concept which is entirely different from the concepts involved in the use of the background coloring material in the compositions of the present invention.

The constituents of the present test composition will now be discussed in some detail. As previously noted herein, the chromogenic indicator which is sensitive to the presence of protein, i.e., the chromogenic indicator exhibiting protein error, is essentially a pH indicator material. This chromogenic indicator may thus be any pH sensitive material which exhibits the co-called protein error phenomenon. It should be noted that alkaline pH indicators as well as acid pH indicators may be utilized in the present invention. That is to say, the particular pH range in which the chromogenic indicator normally responds may be at a pH higher or lower than pH 7. Moreover, the particular direction of the pH shift due to the presence of protein in the solution under test may be from the acid to base direction or from the base to acid direction.

Exemplary of these chromogenic materials exhibiting the protein error phenomenon are the following: tetrabromphenol blue, bromcresol green, methyl yellow, congo red, bromthymol blue, thymol blue, bromphenol blue, tetabromphenolphthalein ethyl and butyl esters, methyl violet 5B, sodium alizarine sulfonate, alizarine, bromcresol purple, o-cresolsulfonephthalein, and the like. Because of the availability of excellent solid acidic buffer materials, the preferable chromogenic indicators are those which are responsive in the acid pH range. Because of their sensitivity to protein, tetrabromphenol blue, and tetrabromphenolphthalein ethyl ester are preferable indicators for use in the present invention.

In practice, the form of the indicator used may be either the free base or a salt thereof and, as disclosed and claimed herein, the base form of the indicator includes any salt form thereof. If it is desired to utilize the test composition in an aqueous system, the salt form of the indicator may be employed because of its increased water solubility. However, if test strips are to be prepared from a solution of the test composition, then it may be advantageous from the standpoint of volatility of solvent to utilize alcohol or other water miscible organic solvents in the solution, and the free base form of the indicator therefore may be used. The choice, however, is not critical and depends on the indicator material selected as well as the test system requirements.

In selecting the buffer system of the present composition, the choice of chromogenic material is, of course, determinative of the choice of buffer. If an acid responsive chromogenic material is utilized, any suitable acid-reacting substance can be used as a buffer if it is capable of adjusting the pH to the desired area within the normal pH color change range of the chromogenic indicator. For example where the indicator used is tetrabromphenol blue which is normally chromogenically responsive in a pH range of 3.0 to 4,6, the acid must be capable of buffering the pH of the composition to within this range. In this regard it has been found that the preferable pH range for this indicator material is from about pH 3.4 to about 4.0 and the buffer thus employed must be capable of adjusting the pH of the test composition using tetrabromphenol blue into this preferable range. In utilizing the other preferred indicator material, tetrabromphenolphthalein ethyl ester, which has a normal pH response range of from about 3.7 to about 5.2, the buffer system must be capable of adjusting the pH of the test composition to within the preferred pH range for this indicator, i.e., from about 4.0 to about 4.8.

The following acids, together with their salts, have been found useful in the present invention and may be employed singly or as various combinations: citric acid, tartaric acid, maleic acid, ascorbic acid, salicyclic acid, sulfosalicyclic acid, oxalic acid, itaconic acid, gluconic acid, sulfamic acid, succinic acid, benzoic acid, mandelic acid, glutaric acid, malic acid, phthalic acid, boric acid, phosphoric acid and the like. It should be noted that the selection of such a buffer system is entirely within the discretion and purview of one skilled in the art and, of course, the amount used is adjusted according to the strength of the particular acid and chromogenic indicator being used. A sodium citrate-citric acid buffer system is used in the preferred embodiment of the present invention.

As noted hereinbefore, a background coloring material is preferably utilized in the compositions of the present invention. The use of this material achieves two functions (1) it tends to dominate or mask any slight response hue which may be exhibited by the composition prior to contacting a protein-containing solution due to the fact that the indicator material is buffered into the response range, and (2) it enables the obtention of a response which exhibits pronounced changes in hue rather than merely changes in saturation of color. The selection of this background coloring material is based on the particular acid hue and basic hue of the chromogenic indicator exhibiting protein error. In this respect it has been found that the background coloring material should preferably have a hue the same as that of the indicator material prior to responding to protein and which when combined with the hue exhibited by the indicator material when responding to the presence of protein, results in a third and different color hue. For example, when using the preferred chromogenic indicators, tetrabromphenol blue and tetrabromphenolphthalein ethyl ester, which are yellow on the acid side and blue on the basic side or when responding to the presence of protein, the preferred background coloring material hue is yellow. The yellow hue tends to dominate over or mask any faint blue or green response which might tend to occur under the pH conditions utilized or found even though no protein is present in the solution being tested. Such false positive response can occur, for example, when the urine or other fluid being tested is highly alkaline. When a somewhat more intense hue is produced by the chromogenic indicator material, as when protein is present in intermediate quantities, the yellow background coloring material combines with the blue hue to give an intermediate hue of green, thus affording a more precise quantitative indication than that provided when the background color is not present.

Exemplary of the numerous background coloring materials which may be employed in the present invention are the following:

FD & C Yellow No. 1—Disodium salt of 2,4-dinitro-1-naphthol-7-sulfonic acid.
FD & C Yellow No. 2—Dipotassium salt of 2,4-dinitro-1-naphthol-7-sulfonic acid.
FD & C Yellow No. 5—Trisodium salt of 3-carboxy-5-hydroxy-1-p-sulfophenyl-4-p-sulfophenylazopyrazole.
D & C Yellow No. 1—Naphthol Yellow Lake; Lake of FD & C Yellow No. 1.
Ext. D & C Yellow No. 1—Monosodium salt of 4-m-sulfophenylazo-diphenylamine.
FD & C Blue No. 1—Disodium salt of 4-([4-(N-ethyl-p-sulfobenzylamino) - phenyl] - (2-sulfoniumphenyl)-methylene) - [1-(N-ethyl-N-p-sulfobenzyl)-$\Delta^{2,5}$-cyclohexadienimine].
FD & C Red No. 3—Disodium salt of 9-o-carboxyphenyl-6-hydroxy-2,4,5,7,tetraiodo-3-isoxanthone.
FD & C Green No. 2—Disodium salt of 4-([4-(N-ethyl-p-sulfobenzylamino) - phenyl] - (4-sulfoniumphenyl)-methylene) - [1-(N-ethyl-N-p-sulfobenzyl)-$\Delta^{2,5}$-cyclohexadienimine].
FD & C Orange No. 1—Monosodium salt of 4-p-sulfophenylazo-1-naphthol.

It should be noted that, although non-pH sensitive background coloring materials are usually utilized, a material such as o-cresolsulfonphthalein, which exhibits the protein error phenomenon, or 1,2-dihydroxyanthraquinone, which is pH sensitive, may also be employed as background coloring materials in the present invention if such materials are not color responsive at the particular pH utilized in the system. In the preferred compositions of the present invention FD & C Yellow No. 5 (tartrazine) is used as the background coloring material for the chromogenic indicators, tetrabromphenol blue, and tetrabromphenolphthalein ethyl ester.

It will be appreciated that because of the wide range of materials available in the practice of the present invention, the various ingredients thereof may be present in the test composition over an extremely wide range of proportions. With the present disclosure, however, one skilled in the art may readily determine such proportions using rather routine experimentation.

As noted at the beginning of this disclosure, it is preferable in the present invention to incorporate the test composition on or within a carrier member and to utilize this combination as a dip and read test device. This is not, however, to be construed as placing any limitation on the physical make-up of the present novel test composition. It will be appreciated that such compositions may be utilized in the form of tablets, powders and solutions, only to mention a few of the various forms thereof. However, in the preferable embodiment of the present invention the test composition is incorporated into and/or upon a carrier member. This may be achieved by various methods, which include, impregnating a bibulous material with a solution of the test composition and thereafter drying the impregnated test device, adhesively fixing to the surface of the carrier, a finely divided, dry, intimate mixture of the ingredients, and the like. The preferable mode of preparation is the impregnation of a bibulous carrier with a solution or solutions of the test composition, followed by drying.

When a bibulous carrier is employed the carrier material may be any of a variety of substances. For example, filter paper, wood strips, synthetic plastic fibrous materials, non-woven or woven fabrics and so on, may be utilized in this embodiment. The preferable bibulous material is filter paper having a thickness of about 0.01 inch to about 0.02 inch.

The mode of use of the test device, using the impregnated bibulous carrier will now be described. In conducting the test for protein, the device is immersed in the fluid being tested and immediately withdrawn. This is done since the pH of the moistened device must be dominated by the buffer in the test composition. If the test device were allowed to remain in the fluid for any length of time, there would be a danger that the test composition ingredients would be leached from the carrier into the fluid. The color developed due to the presence of protein is then ready by its visual appearance or by comparison with a color chart. Various instrumental methods may also be employed to determine the quality of the color developed, thus increasing the accuracy of the test by removing the subjective determination of color by the human eye.

The actual compounding of the test composition will be illustrated by the following examples which are included for illustrative purposes only and are not to be construed as placing any limitation upon the inventive concept as disclosed herein. Moreover, it should again be noted that the pH response ranges shown in the following examples are for illustrative purposes only since individual samples of indicator materials may vary therefrom as disclosed hereinabove.

EXAMPLES 1–6

The compositions in Table I were prepared as follows: a buffer solution was first prepared by mixing the sodium citrate, citric acid and water. The solution was then combined with the indicated amount of a 0.1% aqueous solution of tartrazine and the combination mixed with a solution comprising the indicated amounts of ethanol and tetrabromphenol blue. Table I indicates the pH of the buffer solution. Strips of Eatman and Dikeman No. 641 filter paper were dipped into the various compositions, allowed to drain and dried at 100° C. for 11 minutes. When 40 square inches of the impregnated strip was extracted with 15 ml. water, the strips exhibited substantially the same pH as that of the buffer solution. Upon contact with various solutions containing from 0 to 1000 mg. percent of protein, the strips prepared from the test compositions of Examples 1–6 were capable of accurately detecting the quantity of protein present to a lower concentration limit of from about 5–10 mg. percent. The hue change was from yellow or a slight off-yellow to blue with various intermediate hues depending on the amount of protein present in the solution. Table II shows specifically the color response of the test composition in Example 2. Of the test compositions shown in Table I, Examples 2–5 were found to give a superior response in terms of vividness and gradient of color. The test compositions of Examples 1 and 6 were, however, also found superior in both sensitivity and quantitative accuracy to prior art compositions.

TABLE I

|  | Example | | | | | |
| --- | --- | --- | --- | --- | --- | --- |
|  | 1 | 2 | 3 | 4 | 5 | 6 |
| Sodium Citrate [1] (g.) | 10.06 | 10.06 | 10.06 | 10.06 | 10.06 | 10.06 |
| Citric Acid [2] (g.) | 17.50 | 15.00 | 12.50 | 10.00 | 7.50 | 5.00 |
| Water (ml.) | 145.4 | 142.4 | 139.4 | 139.4 | 131.4 | 121.4 |
| Tetrabromphenol Blue [3] (mg.) | 48.6 | 48.6 | 48.6 | 48.6 | 48.6 | 48.6 |
| Ethanol (95%) (ml.) | 48.6 | 48.6 | 48.6 | 48.6 | 48.6 | 48.6 |
| Tartrazine Solution (ml.) | 6.0 | 9.0 | 12.0 | 12.0 | 20.0 | 30.0 |
| pH of Buffer Solution | 3.2 | 3.4 | 3.5 | 3.7 | 4.0 | 4.4 |

[1] $C_6H_5Na_3O_7 \cdot 2H_2O$.
[2] Anhydrous.
[3] Normal pH response range 3.0 to 4.6.

TABLE II

| Amount of protein in solution (mg.-percent): | Hue of strip [1] |
| --- | --- |
| 0 | Pyrethrum yellow (51). |
| 5–20 [2] | Apple green (57). |
| 30 | Variscate green (66). |
| 100 | Turquoise green (72). |
| 300 | Turquoise blue (75). |
| 1000+ | Blue turquoise (78). |

[1] After contacting protein containing solution. Color definition and number according to Webster's New International Dictionary of the English Language (Unabridged), 2nd edition (1941), G. and C. Merriam Company, Springfield, Massachusetts.
[2] Differences between 5–20 mg.-percent protein distinguishable by slight off shade from apple green (57) hue.

EXAMPLES 7–11

The solutions indicated in Table III were prepared by first dissolving 3.5 grams of citric acid, anhydrous, and the indicated amounts of sodium citrate, dihydrate, in 100 ml. of distilled water and thereafter mixing this solution with the 100 ml. of a 0.04% ethyl alcohol solution of tetrabromphenolphthalein ethyl ester (normal pH response range—3.7 to 5.2). The resultant solution had the pH indicated in Table III. Test strips were prepared from these solutions using the procedure set out in Examples 1–6.

TABLE III

|  | Example | | | | |
| --- | --- | --- | --- | --- | --- |
|  | 7 | 8 | 9 | 10 | 11 |
| Sodium Citrate (g.) | 1.0 | 1.6 | 2.3 | 3.7 | 4.2 |
| Citric Acid (g.) | 3.5 | 3.5 | 3.5 | 3.5 | 3.5 |
| Water (ml.) | 100 | 100 | 100 | 100 | 100 |
| Tetrabromphenolphthalein ethyl ester (g.) | 0.04 | 0.04 | 0.04 | 0.04 | 0.04 |
| Ethanol (95%) (ml.) | 100 | 100 | 100 | 100 | 100 |
| pH of Resultant Solution | 3.75 | 4.0 | 4.4 | 4.8 | 5.2 |

The test strips had the following color when dry:

| Example | Color (Hue) |
| --- | --- |
| 7 | Yellow. |
| 8 | Yellow. |
| 9 | Slightly greenish yellow. |
| 10 | Greenish yellow. |
| 11 | Greenish blue. |

When contacted with a urine sample which was divided into portions which were made to contain various amounts of protein respectively, the strips prepared according to Examples 7 and 11 were just capable of detecting 0.004% (4 mg. percent) added protein (slight off color), while the strips prepared according to Examples 8–10 showed a pronounced color change in detecting 0.004% protein. In all tests a strip contacted with the original urine, which was assayed and contained negligible protein, was used as a basis for color comparisons.

In the following Examples 12–18 compositions and test strips were prepared according to the procedure indicated in Examples 1–6. These compositions and strips had the indicated proportions of ingredients and characteristics. The pH shown is that of the impregnating solution. Those impregnating solutions containing alcohol were found to exhibit a pH about 0.2 pH unit higher than that of the buffer solution used. The resultant strips thus exhibit a pH of about 0.2 pH units lower than that of the impregnating solutions.

EXAMPLE 12

Test composition:
- Sodium citrate (dihydrate) _____g__ 3.2
- Citric acid (anhydrous) _____g__ 2.0
- Bromcresol green _____g__ 0.1
- Ethanol (95%) _____ml__ 30.0
- Water—distilled _____ml__ 120.0
- pH of impregnating solution _____ 4.5

Characteristics of indicator—bromcresol green:
- Acid hue _____ Yellow
- Basic hue _____ Blue
- Normal pH response range _____ 3.8–5.4

Characteristics of test strip:
- Hue of dry strip _____ Yellow
- Hue of strip after contact with a solution containing protein _____ Blue

EXAMPLE 13

Test composition:
- Sodium citrate (dihydrate) _____g__ 27.0
- Citric acid (anhydrous) _____g__ 2.0
- Bromcresol purple _____g__ 0.1
- Ethanol (95%) _____ml__ 30.0
- Water—distilled _____ml__ 120.0
- pH of resultant solution _____ 5.8

Characteristics of indicator—bromcresol purple:
- Acid hue _____ Yellow
- Basic hue _____ Purple
- Normal pH response range _____ 5.2–6.8

Characteristics of test strip:
- Hue of dry strip _____ Yellow
- Hue of strip after contact with a solution containing protein _____ Purple

EXAMPLE 14

Test composition:
- Sodium citrate (dihydrate) _____g__ 11.1
- o-Cresolsulfonephthalein (Cresol Red) __g__ 0.05
- Ethanol (95%) _____ml__ 30.0
- Water—distilled _____ml__ 120.0
- pH of resultant solution _____ 7.9

Characteristics of indicator—o-Cresolsulfonephthalein (Cresol Red):
- Acid hue _____ Yellow
- Basic hue _____ Red
- Normal pH response range _____ 7.0–8.8

Characteristics of test strip:
- Hue of dry strip _____ Red-Orange
- Hue of strip after contact with a solution containing protein _____ Yellow

EXAMPLE 15

Test composition:
- Phosphate buffer—pH 6.61 (0.2 M) ____ml__ 120.0
- Bromthymol blue W.S. _____g__ 0.05
- Ethanol (95%) _____ml__ 30.0
- pH of resultant solution _____ 7.0

Characteristics of indicator—bromthymol blue W.S.:
- Acid hue _____ Yellow
- Basic hue _____ Blue
- Normal pH response range _____ 6.0–7.6

Characteristics of test strip:
- Hue of dry strip _____ Green
- Hue of strip after contact with a solution containing protein _____ Yellow

EXAMPLE 16

Test composition:
- Sodium citrate (dihydrate) _____g__ 9.6
- Citric acid (anhydrous) _____g__ 9.0
- Bromphenol blue sodium salt _____g__ 0.04
- Water—distilled _____ml__ 100.0
- pH of resultant solution _____ 3.4

Characteristics of indicator—bromphenol blue sodium salt:
- Acid hue _____ Yellow
- Basic hue _____ Blue
- Normal pH response range _____ 3.0–4.6

Characteristics of test strip:
- Hue of dry strip _____ Yellow
- Hue of strip after contact with a solution containing protein _____ Blue

EXAMPLE 17

Test composition:
- Borax _____ g__ 3.0
- Boric acid _____ g__ 0.65
- Thymol blue _____ g__ 0.016
- Water—distilled _____ ml__ 100.0
- pH of resultant solution _____ 8.8

Characteristics of indicator—thymol blue:
- Acid hue _____ Yellow
- Basic hue _____ Blue
- Normal pH response range _____ 8.0–9.6

Characteristics of test strip:
- Hue of dry strip _____ Blue
- Hue of strip after contact with a solution containing protein _____ Grey

EXAMPLE 18

A composition was prepared as a dry mix having the formulation of Example 5, excluding the water. The alcohol was added as a moistening agent and small tablets weighing 0.14 g. were prepared therefrom. One of these tablets was added to each of a series of 0.5 ml. urine samples containing 0%, 0.01%, 0.03%, 0.10%, 0.30% and 1.0% protein. The 0% urine sample turned a yellowish olive hue while the 1% protein containing urine sample turned blue turquoise. The various samples of intermediate protein content turned a shade of blue-green in proportion to the amount of protein present. These samples were amenable to a visual or electronic estimation of hue, which permitted a quantitaiton of the sample.

In summary, the present invention provides an extremely sensitive test composition and device for the detection of proteins in fluids. This test composition comprises a chromogenic indicator which exhibits protein error and a buffer for maintaining the pH of the system at a point within the normal pH response range of the indicator. Additionally a background coloring material is utilized in the test composition to avoid false positive responses and to achieve marked differences in hue which correspond to the amount of protein present in the fluid being tested.

What is claimed is:

1. A test composition for detecting protein in fluids which comprises:
    (A) a pH responsive chromogenic indicator which exhibits protein error and has a normal fixed acid hue and a normal fixed basic hue;
    (B) a buffer which maintains the pH of the composition at a value within the pH range in which the chromogenic indicator is normally responsive to a change in pH, whereby the indicator upon contact with protein undergoes a color change toward one of the fixed hues; and
    (C) a background coloring material which exhibits the other fixed hue.

2. A test composition as in claim 1 wherein the buffer maintains the pH of the composition at a value adjacent to the midpoint of the pH range in which the chromogenic indicator is normally responsive to a change in pH.

3. A test composition as in claim 1 wherein the indicator material is selected from the group consisting of tetrabromphenol blue, tetrabromphenolphthalein ethyl ester, tetrabromphenolphthalein butyl ester, bromcresol green, methyl yellow, Congo red, bromthymol blue, thymol blue, bromphenol blue, methyl violet 5B, sodium alizarine sulfonate, alizarine, bromcresol purple and o-cresolsulfonephthalein.

4. A test composition as in claim 1 wherein the indicator upon contact with protein undergoes a color change toward the fixed basic hue and the background coloring material exhibits the fixed acid hue.

5. A test composition as in claim 1 wherein the indicator is tetrabromphenolphthalein ethyl ester and the buffer maintains the pH of the composition within the range 3.7 to 5.2.

6. A test composition as in claim 5 wherein the buffer maintains the pH of the test composition within the range 4.0 to 4.8.

7. A test composition as in claim 1 wherein the indicator is tetrabromphenol blue and the buffer maintains the pH of the composition within the range 3.0 to 4.6.

8. A test composition as in claim 7 wherein the buffer maintains the pH of the composition within the range 3.4 to 4.0.

9. A test composition as in claim 7 wherein the background coloring material is tartrazine.

10. A test device for detecting proteins in fluids which comprises a carrier member having thereon a test composition comprising:
    (A) a pH responsive chromogenic indicator which exhibits protein error and has a normal fixed acid hue and a normal fixed basic hue;
    (B) a buffer which maintains the pH of the composition at a value within the pH range in which the chromogenic indicator is normally responsive to a change in pH, whereby the indicator upon contact with protein undergoes a color change toward one of the fixed hues; and
    (C) a background coloring material which exhibits the other fixed hue.

11. A test device as in claim 10 wherein the buffer maintains the pH of the composition at a value adjacent to the midpoint of the pH range in which the chromogenic indicator is normally responsive to a change in pH.

12. A test device as in claim 10 wherein the indicator is selected from the group consisting of tetrabromphenol blue, tetrabromphenolphthalein ethyl ester, tetrabromphenolphthalein butyl ester, bromcresol green, methyl yellow, Congo red, bromthymol blue, thymol blue, bromphenol blue, methyl violet 5B, sodium alizarine sulfonate, alizarine, bromcresol purple and o-cresolsulfonephthalein.

13. A test device as in claim 10 wherein the indicator upon contact with protein undergoes a color change toward the fixed basic hue and the background coloring material exhibits the fixed acid hue.

14. A test device as in claim 10 wherein the indicator is tertabromphenolphthalein ethyl ester and the buffer maintains the pH within the range 3.7 to 5.2.

15. A test device as in claim 14 wherein the buffer maintains the pH of the device within the range 4.0 to 4.8.

16. A test device as in claim 10 wherein the indicator is tetrabromphenol blue and the buffer maintains the pH within the range 3.0 to 4.6.

17. A test device as in claim 16 wherein the buffer maintains the pH within the range 3.5 to 4.0.

18. A test device as in claim 16 wherein the background coloring material is tartrazine.

19. A process for detecting proteins in fluids which comprises contacting the fluid to be tested with a test composition comprising:
    (A) a pH responsive chromogenic indicator which exhibits protein error and has a normal fixed acid hue and a normal fixed basic hue;
    (B) a buffer which maintains the pH of the composition at a value within the pH range in which the chromogenic indicator is normally responsive to a change in pH, whereby the indicator upon contact with protein undergoes a color change toward one of the fixed hues; and (C) a background coloring material which exhibits the other fixed hue.

20. A process as in claim 19 wherein the buffer maintains the pH of the composition at a value adjacent to the midpoint of the pH range in which the chromogenic indicator is normally responsive to a change in pH.

21. A process as in claim 19 wherein the indicator is selected from the group consisting of tetrabromphenol blue, tertabromphenolphthalein ethyl ester, tetrabromphenolphthalein butyl ester, bromcresol green, methyl yellow, Congo red, bromthymol blue, thymol blue, bromphenol blue, methyl violet 5B, sodium alizarine sulfonate, alizarine, bromcresol purple and o-cresolsulfonephthalein.

22. A process as in claim 19 wherein the indicator upon contact with protein undergoes a color change toward the fixed basic hue and the background coloring material exhibits the fixed acid hue.

23. A process as in claim 19 wherein the test composition is incorporated with a carrier member.

24. A process as in claim 19 wherein the indicator is tetrabromphenolphthalein ethyl ester and the buffer maintains the pH of the composition within the range 3.7 to 5.2.

25. A process as in claim 24 wherein the buffer maintains the pH within the range 4.0 to 4.8.

26. A process as in claim 19 wherein the indicator is tetrabromphenol blue and the buffer maintains the pH of the composition within the range 3.0 to 4.6.

27. A process as in claim 26 wherein the buffer maintains the pH of the composition within the range 3.4 to 4.0.

28. A process as in claim 26 wherein the background coloring material is tartrazine.

References Cited

UNITED STATES PATENTS

| | | | |
|---|---|---|---|
| 2,897,058 | 7/1959 | Galat | 23—230 |
| 3,008,879 | 11/1961 | Harvill | 23—253 X |
| 3,063,812 | 11/1962 | Collins | 23—230 |
| 3,122,420 | 2/1964 | Rebar et al. | 23—253 |
| 3,146,070 | 8/1964 | Collins | 23—253 |

FOREIGN PATENTS

| | | |
|---|---|---|
| 799,626 | 8/1958 | Great Britain. |
| 814,223 | 6/1959 | Great Britain. |
| 840,362 | 7/1960 | Great Britain. |
| 997,603 | 7/1965 | Great Britain. |

MORIS O. WOLK, *Primary Examiner.*

SIDNEY MARANTZ, *Assistant Examiner.*

U.S. Cl. X.R.

23—253; 252—408; 83—176, 349